US008947445B2

(12) United States Patent
Han

(10) Patent No.: US 8,947,445 B2
(45) Date of Patent: Feb. 3, 2015

(54) DISPLAY CONTROLLER AND DISPLAY DEVICE INCLUDING THE SAME

(75) Inventor: Jun-Seok Han, Yongin-si (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 275 days.

(21) Appl. No.: 13/494,332

(22) Filed: Jun. 12, 2012

(65) Prior Publication Data

US 2013/0100148 A1 Apr. 25, 2013

(30) Foreign Application Priority Data

Oct. 20, 2011 (KR) ........................ 10-2011-0107362

(51) Int. Cl.

| | |
|---|---|
| ***G09G 5/39*** | (2006.01) |
| ***G06F 9/32*** | (2006.01) |
| ***G09G 5/395*** | (2006.01) |
| ***G09G 3/20*** | (2006.01) |
| ***G09G 3/36*** | (2006.01) |

(52) U.S. Cl.

CPC .................. *G09G 5/395* (2013.01); *G09G 3/20* (2013.01); *G09G 3/36* (2013.01)

USPC ............................ 345/531; 711/202; 345/569

(58) Field of Classification Search

CPC ........... G09G 5/39; G09G 5/395; G09G 3/36; G09G 3/20

USPC ........................... 345/531, 568, 569; 711/202

See application file for complete search history.

(56) References Cited

U.S. PATENT DOCUMENTS

| | | | | |
|---|---|---|---|---|
| 5,287,100 | A * | 2/1994 | Guttag et al. | 345/213 |
| 5,559,952 | A * | 9/1996 | Fujimoto | 345/557 |
| 6,028,807 | A * | 2/2000 | Awsienko | 365/230.02 |
| 6,111,584 | A * | 8/2000 | Murphy | 345/582 |
| 6,847,370 | B2 * | 1/2005 | Baldwin et al. | 345/564 |
| 2003/0043125 | A1 | 3/2003 | Kojima et al. | |
| 2010/0214304 | A1 * | 8/2010 | Jonas | 345/541 |
| 2011/0188580 | A1 * | 8/2011 | Valmiki et al. | 375/240.24 |

FOREIGN PATENT DOCUMENTS

| | | | |
|---|---|---|---|
| JP | 05-020169 | A | 1/1993 |
| JP | 05-120119 | A | 5/1993 |
| JP | 2001-318653 | A | 11/2001 |
| JP | 2003-066938 | A | 3/2003 |

* cited by examiner

*Primary Examiner* — Kee M Tung
*Assistant Examiner* — Yuehan Wang
(74) *Attorney, Agent, or Firm* — Harness, Dickey & Pierce, P.L.C.

(57) ABSTRACT

A display controller includes a graphic memory, a graphic memory control unit and a scan control unit. The graphic memory has a storage capacity defined by a first directional size multiplied by a second directional size. The graphic memory control unit converts two-dimensional (2-D) addresses to one-dimensional (1-D) addresses based on an input clock signal and first directional total pixel number of a display panel for displaying input data, converts the 1-D addresses to physical 2-D addresses based on the first directional size and controls the graphic memory to store the input data. The display panel has a resolution corresponding to the first directional total pixel number multiplied by a second directional total pixel number of the display panel. The scan control unit increases scan addresses one line by one line to display data stored in the graphic memory according to a display resolution.

18 Claims, 9 Drawing Sheets

100

FIG. 9

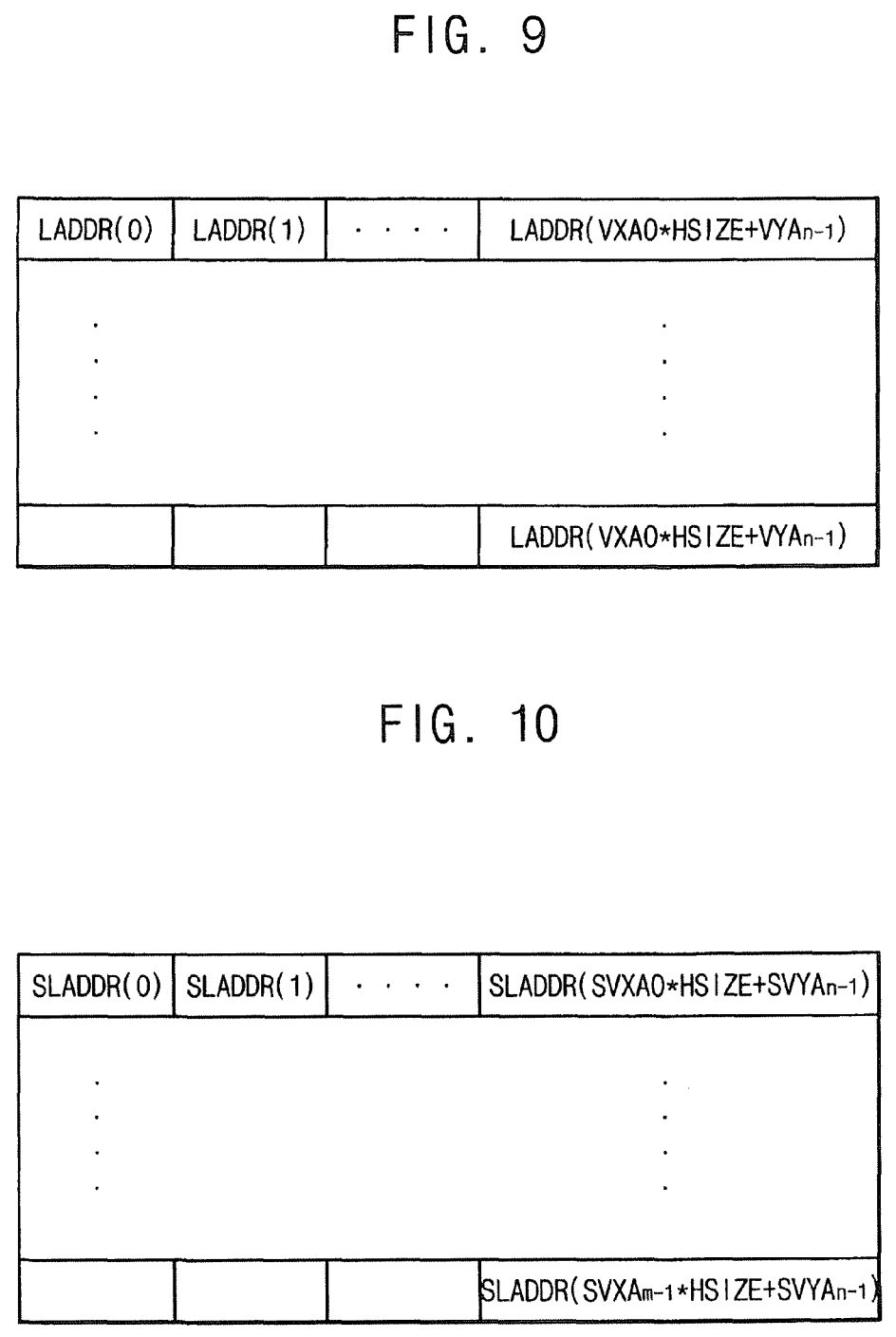

| | | | |
|---|---|---|---|
| LADDR(0) | LADDR(1) | · · · · | LADDR(VXA0*HSIZE+VYA$_{n-1}$) |
| ⋮ | | | ⋮ |
| | | | LADDR(VXA0*HSIZE+VYA$_{n-1}$) |

FIG. 10

| | | | |
|---|---|---|---|
| SLADDR(0) | SLADDR(1) | · · · · | SLADDR(SVXA0*HSIZE+SVYA$_{n-1}$) |
| ⋮ | | | ⋮ |
| | | | SLADDR(SVXA$_{m-1}$*HSIZE+SVYA$_{n-1}$) |

DISPLAY CONTROLLER AND DISPLAY DEVICE INCLUDING THE SAME

CROSS-REFERENCE TO RELATED APPLICATION(S)

This application claims priority under 35 USC §119 to Korean Patent Application No. 10-2011-0107362, filed on Oct. 20, 2011, in the Korean Intellectual Property Office (KIPO), the contents of which are incorporated herein in its entirety by reference.

BACKGROUND

1. Technical Field

Example embodiments relate generally to display devices, more particularly to a display controller and a display device including the same.

2. Description of the Related Art

Display devices of various electronic apparatuses, which include devices such as a liquid crystal display device, have become more sophisticated from year to year. For example, as display performance of the display device improved, high gradation displays have been required. Moreover, contents displayed on the display device have been required to be not only still pictures but also motion pictures. With such a sophisticated display device, the amount of information that is necessary to display is increasing.

A system for displaying includes devices such as a central processor, a display control device, and a display device. The central processor processes a variety of information, the display control device carries out display control for the display device in accordance with display data supplied from the central processor, and the display device carries out an actual display. In such a system, as information increases and the display device becomes more sophisticated as described above, load of image processing on the central processor increases.

The display control device displays an image in one of a portrait mode and a landscape mode. Here, the portrait mode is the mode that a longitudinal length of the image is greater than its lateral length. The landscape mode is the mode that the lateral length of the image is greater than the longitudinal length.

Therefore, there are needs for display devices capable of displaying images in both modes.

SUMMARY

Some example embodiments provide a display controller capable of supporting a portrait mode and a landscape mode without increasing areas of graphic memories.

Some example embodiments provide a display device including the display controller.

According to example embodiments, a display controller includes a graphic memory, a graphic memory control unit and a scan control unit. The graphic memory has a storage capacity defined by a first directional size multiplied by a second directional size. The graphic memory control unit converts two-dimensional (2-D) addresses to one-dimensional (1-D) addresses based on an input clock signal and first directional total pixel number of a display panel for displaying input data, converts the 1-D addresses to physical 2-D addresses based on the first directional size and controls the graphic memory to store the input data. The display panel has a resolution corresponding to the first directional total pixel number multiplied by a second directional total pixel number of the display panel. The scan control unit increases scan addresses one line by one line to display data stored in the graphic memory according to a display resolution.

In some embodiments, the graphic memory control unit may include an address counter which generates the 2-D addresses based on the input clock signal and a control signal; and an address converter which converts the 2-D addresses to the 1-D addresses based on the first directional total pixel number and converts the 1-D addresses to the physical 2-D addresses based on the first directional size.

The 2-D addresses may be converted to the 1-D addresses based on a following equation 1:

$$\mathrm{LADDR}=VXA\times HRES+VYA, \quad \text{[equation 1]}$$

where VXA denotes page addresses of the 2-D addresses, VYA denotes column addresses of the 2-D addresses, HRES denotes the first directional total pixel number and LADDR denotes the 1-D addresses.

The 1-D addresses may be converted to the physical 2-D addresses based on a following equation 2.

$$PXA=\mathrm{LADDR}/H\mathrm{SIZE},$$

$$PYA=\mathrm{LADDR}\ \%\ H\mathrm{SIZE}, \quad \text{[equation 2]}$$

where HSIZE denotes the first directional size, PXA denotes physical pages addresses of the physical 2-D addresses and PYA denotes physical column addresses of the physical 2-D addresses.

The graphic memory may include a plurality memory areas separate from each other.

The display controller may further include an address mapper which interleaves the physical 2-D addresses such that each input of a plurality of consecutive input data is not consecutively written to the same memory areas of the plurality memory areas.

The display controller may further include a control register which receives a control signal to provide information of the first directional total pixel number and the first directional size to the graphic memory control unit and to the scan control unit.

The control register may receive the control signal to provide rotation information of an image indicating a display mode of the display panel to the graphic memory control unit and to the scan control unit.

In some embodiments, the scan control unit may include an address counter which generates the 2-D scan addresses based on an internal clock signal and a control signal; and an address converter which converts the 2-D scan addresses to 1-D scan addresses based on the first directional total pixel number and configured to convert the 1-D scan addresses to physical 2-D scan addresses based on the first directional size.

The 2-D scan addresses may be converted to the 1-D addresses based on a following equation 3:

$$\mathrm{SLADDR}=SVXA\times HRES+SVYA, \quad \text{[equation 3]}$$

where SVXA denotes scan page addresses of the 2-D scan addresses, SVYA denotes scan column addresses of the 2-D scan addresses, HRES denotes the first directional total pixel number and SLADDR denotes the 1-D scan addresses.

The 1-D scan addresses may be converted to the physical 2-D scan addresses based on a following equation 4:

$$SPXA=\mathrm{SLADDR}/H\mathrm{SIZE},$$

$$SPYA=\mathrm{LADDR}\ \%\ H\mathrm{SIZE}, \quad \text{[equation 4]}$$

where HSIZE denotes the first directional size, SPXA denotes physical scan page addresses of the physical 2-D scan addresses and SPYA denotes physical scan column addresses of the physical 2-D scan addresses.

According to example embodiments, a display device includes a display panel and a display controller which controls the display panel. The display controller includes a graphic memory, a graphic memory control unit and a scan control unit. The graphic memory has a storage capacity defined by a first directional size multiplied by a second directional size. The graphic memory control unit converts two-dimensional (2-D) addresses to one-dimensional (1-D) addresses based on an input clock signal and first directional total pixel number of the display panel, converts the 1-D addresses to physical 2-D addresses based on the first directional size and controls the graphic memory to store the input data. The display panel has a resolution corresponding to the first directional total pixel number multiplied by a second directional total pixel number of the display panel. The scan control unit increases scan addresses one line by one line to display data stored in the graphic memory according to a display resolution.

The display controller may further include a control register which receives a control signal to provide information of the first directional total pixel number and the first directional size to the graphic memory control unit and to the scan control unit.

According to example embodiments, a display controller includes a graphic memory control unit and a scan control unit. The graphic memory control unit converts first two-dimensional (2-D) addresses to physical 2-D addresses based on an input clock signal and first directional total pixel number of a display panel for displaying input data and a first directional size of a graphic memory. The graphic memory control unit controls the graphic memory to store the input data. The scan control unit increases scan addresses one line by one line to display data stored in the graphic memory. The display panel has a resolution corresponding to the first directional total pixel number multiplied by a second directional total pixel number of the display panel. The graphic memory has a storage capacity defined by the first directional size multiplied by a second directional size.

In some embodiments, the graphic memory control unit may include an address counter which generates the 2-D addresses based on the input clock signal and a control signal; and an address converter which converts the 2-D addresses to the physical 2-D addresses based on the first directional total pixel number and the first directional size.

The first 2-D addresses may be converted to the physical 2-D addresses based on a following equation 5:

$$PXA=(VXA\times HRES+VYA)/HSIZE,$$

$$PYA=(VXA\times HRES+VYA)\%\ HSIZE, \quad \text{[equation 5]}$$

where VXA denotes page addresses of the first 2-D addresses, VYA denotes column addresses of the first 2-D addresses, HRES denotes the first directional total pixel number, HSIZE denotes the first directional size, PXA denotes physical page addresses of the physical 2-D addresses and PYA denotes physical column addresses of the physical 2-D addresses.

In some embodiments, the scan control unit may include an address counter configured to generate 2-D scan addresses based on an internal clock signal and a control signal; and address converter configured to convert the 2-D scan addresses to physical 2-D scan addresses based on the first directional total pixel number and the first directional size.

The 2-D scan addresses may be converted to the physical 2-D scan addresses based on a following equation 6:

$$SPXA=(SVXA\times HRES+VYA)/HSIZE,$$

$$SPYA=(SVXA\times HRES+VYA)\%\ HSIZE, \quad \text{[equation 6]}$$

where SVXA denotes scan page addresses of the 2-D scan addresses, SVYA denotes scan column addresses of the 2-D scan addresses, HRES denotes the first directional total pixel number, HSIZE denotes the first directional size, SPXA denotes physical scan page addresses of the physical 2-D scan addresses and SPYA denotes physical scan column addresses of the physical 2-D scan addresses.

Accordingly, display controller may convert the image in the portrait mode to the image in the landscape mode without increasing areas of the graphic memory without increasing areas of the graphic memory.

BRIEF DESCRIPTION OF THE DRAWINGS

Illustrative, non-limiting example embodiments will be more clearly understood from the following brief description taken in conjunction with the accompanying drawings.

FIG. 9 illustrates an example of 1-D addresses converted in the address converter of FIG. 4 according to example embodiments.

FIG. 10 illustrates an example of 1-D scan addresses converted in the address converter of FIG. 5 according to example embodiments.

Figure 1:
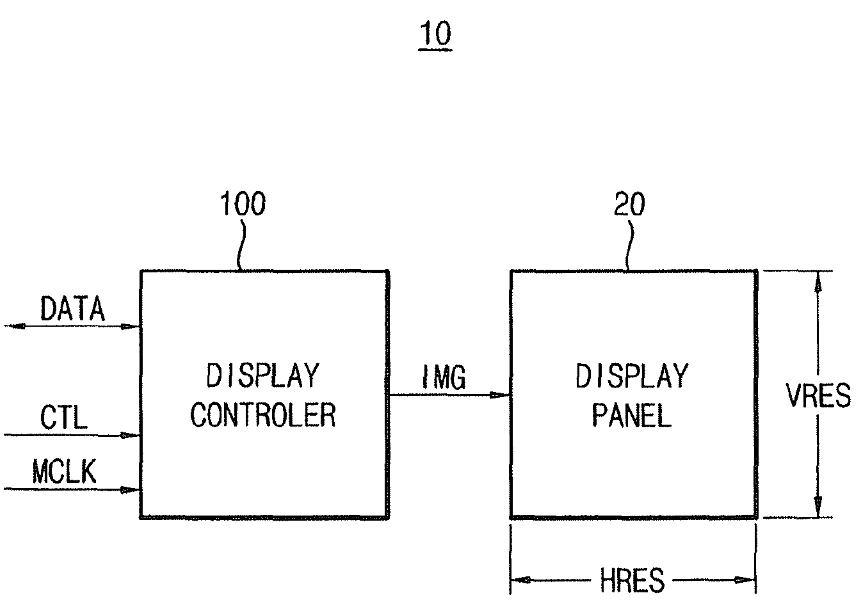
FIG. 1 is a block diagram illustrating an example of a display device according to example embodiments.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of molecules, layers, regions and/or structural elements may be reduced or exaggerated for clarity. The use of similar or identical reference numbers in the various drawings is intended to indicate the presence of a similar or identical element or feature.

DETAILED DESCRIPTION

Various example embodiments will be described more fully hereinafter with reference to the accompanying drawings, in which some example embodiments are shown. Example embodiments may, however, be embodied in many different forms and should not be construed as limited to the example embodiments set forth herein. Rather, these example embodiments are provided so that this disclosure will be thorough and complete, and will fully convey the scope of example embodiments to those skilled in the art. In the drawings, the sizes and relative sizes of layers and regions may be exaggerated for clarity. Like numerals refer to like elements throughout.

It will be understood that, although the terms first, second, third etc. may be used herein to describe various elements, these elements should not be limited by these terms. These terms are used to distinguish one element from another. Thus, a first element discussed below could be termed a second element without departing from the teachings of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a block diagram illustrating an example of a display device according to example embodiments.

Referring to FIG. 1, a display device 10 includes a display controller 100 and a display panel 20.

The display controller 100 may exchange data DATA with an external graphic controller, receive a control signal CTL and an input clock signal MCLK and output image signal IMG to the display panel 20. The display controller 100 may control the display panel 20 such that the image signal IMG is displayed on the display panel 20. In addition, the display controller 100 may provide the data DATA to the external graphic controller or a host according to the control signal CTL. The display panel 20, which actually displays an image in accordance with the image signal IMG may include various display panels such as an organic electroluminescent (EL) panel. The display panel 20 may have a resolution corresponding to first directional total pixel number HRES multiplied by a second directional total pixel number VRES. The first directional total pixel number HRES may correspond to total number of data lines of the display panel 20, and the second directional total pixel number VRES may correspond to total numbers of scan lines of the display panel 20.

The data DATA is a signal that may represent a luminance value in color components, Red, Green, and Blue, of each pixel with respect to an image to be displayed. The control signal CTL is a signal that may include rotation (flip) information of an image, and longitudinal and lateral pixel number information of an image. The rotation information of an image may be such information that in a case where an original image is in a landscape mode, and a display screen in the display panel 20 has a portrait mode, the original image is rotated, for example, by 90 degrees to be displayed. The longitudinal and lateral pixel number information may be information that indicates the number of pixels in a longitudinal direction and a lateral direction of the image to be displayed. The data signal DATA and control signal CTL may be sent from the graphic controller to the display controller 100.

Figure 2:
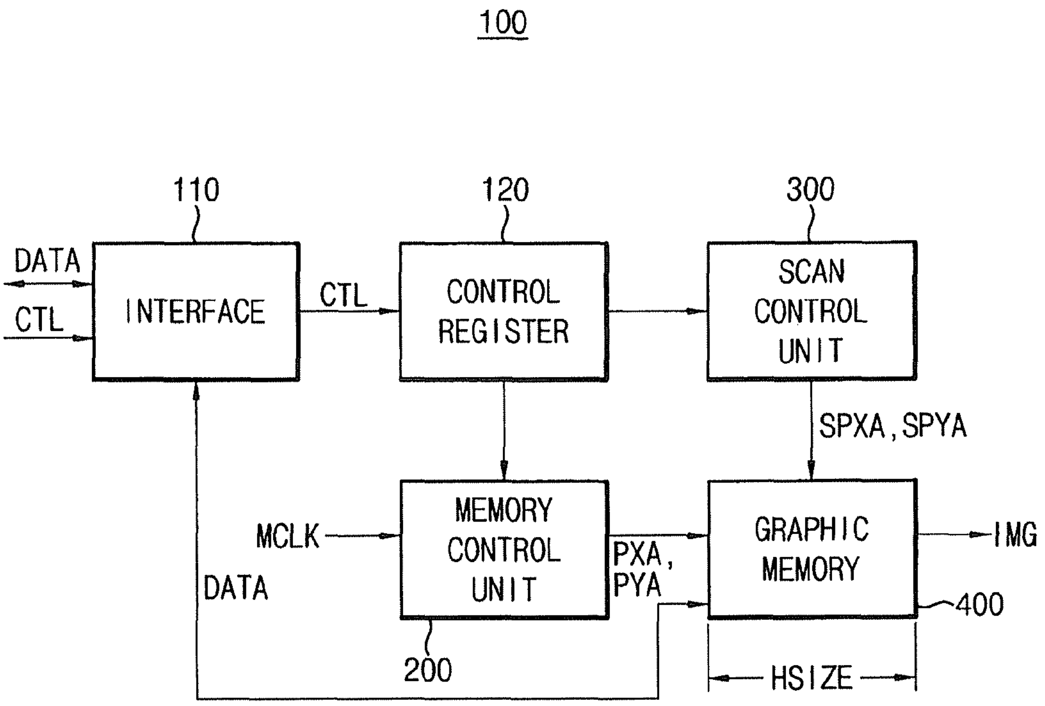
FIG. 2 is a block diagram illustrating an example of a display controller in FIG. 1 according to example embodiments.

FIG. 2 is a block diagram illustrating an example of a display controller in FIG. 1 according to example embodiments.

Referring to FIG. 2, a display controller 100 may include an interface 110, a control register 120, a graphic memory control unit 200, a scan control unit 300 and a graphic memory 400.

The interface 110 may receive the data DATA and the control signal CTL from the graphic controller and provide the control signal CTL to the control register 120 and the data DATA to the graphic memory 400. The graphic memory 400 may have a storage capacity defined by a first directional size HSIZE multiplied by a second directional size VSIZE. The first directional size HSIZE may corresponds to total number of bitlines (or column addresses) of the graphic memory 400, and the second directional size VSIZE may corresponds to total number of wordlines or page(row) addresses of the graphic memory 400.

The control register 120 may receive the control signal CTL from the interface 110, provide information of the first directional total pixel number HRES of the display panel 20 and rotation information of the image in the control signal CTL to the graphic memory control unit 200 and provide the first directional size HSIZE of the graphic memory 400 to the scan control unit 400.

The graphic control unit 200, in a write mode, may convert two-dimensional (2-D) addresses to one-dimensional (1-D) addresses based on the input clock signal MCLK and the first directional total pixel number HRES, convert the 1D addresses to physical 2D addresses PXA and PYA based on the first directional size HSIZE and control the graphic memory 400 to store the input data DATA. The input data DATA may be stored in the graphic memory 400 according to the physical 2D addresses PXA and PYA generated by the graphic control unit 200.

The scan control unit 300, in a scan mode, may convert 2-D scan addresses to 1-D scan addresses based on the first directional total pixel number HRES, convert the 1-D scan addresses to physical 2D scan addresses SPXA and SPYA based on the first directional size HSIZE and increase scan addresses by one line to display data stored in the graphic memory 400 according to a display resolution. The scan control unit 400 may generate the physical 2-D scan addresses SPXA and SPYA and control the graphic memory 400 such that the data stored in the graphic memory 400 is displayed on the display panel 20 by each line. The control register 120 may direct the write mode and scan mode.

Figure 3:
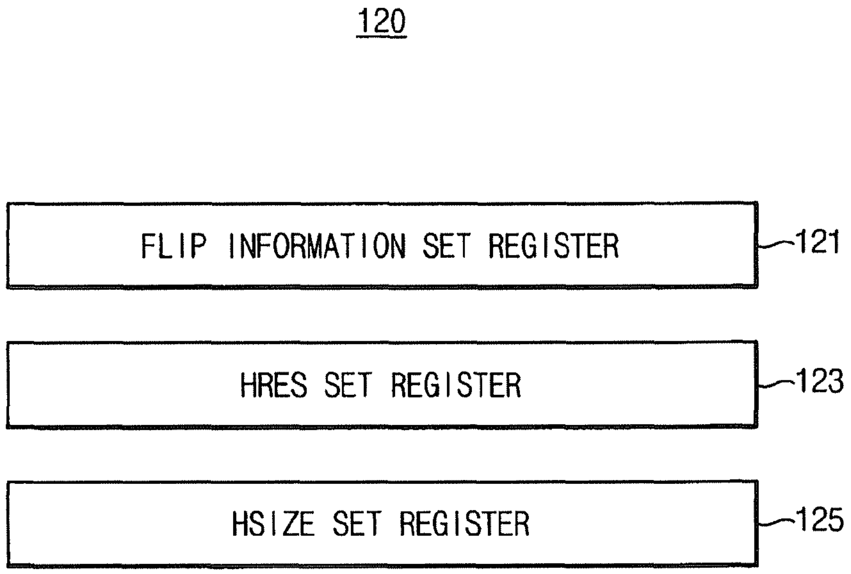
FIG. 3 is a block diagram illustrating an example of a control register in FIG. 2 according to example embodiments.

FIG. 3 is a block diagram illustrating an example of a control register in FIG. 2 according to example embodiments.

Referring to FIG. 3, the control register 120 may include a flip information set register 121, a HRES set register 123 and a HSIZE set register 125. The flip information set register 121 may include information that in a case where an original image is in a landscape mode and a display screen in the display panel 20 has a portrait mode, the original image is rotated, for example, by 90 degrees to be displayed. The HRES set register 123 may include information of a first directional total pixel number HRES of the display panel 20. The HSIZE set register 125 may include information of a first directional size HSIZE of the graphic memory 400.

Figure 4:
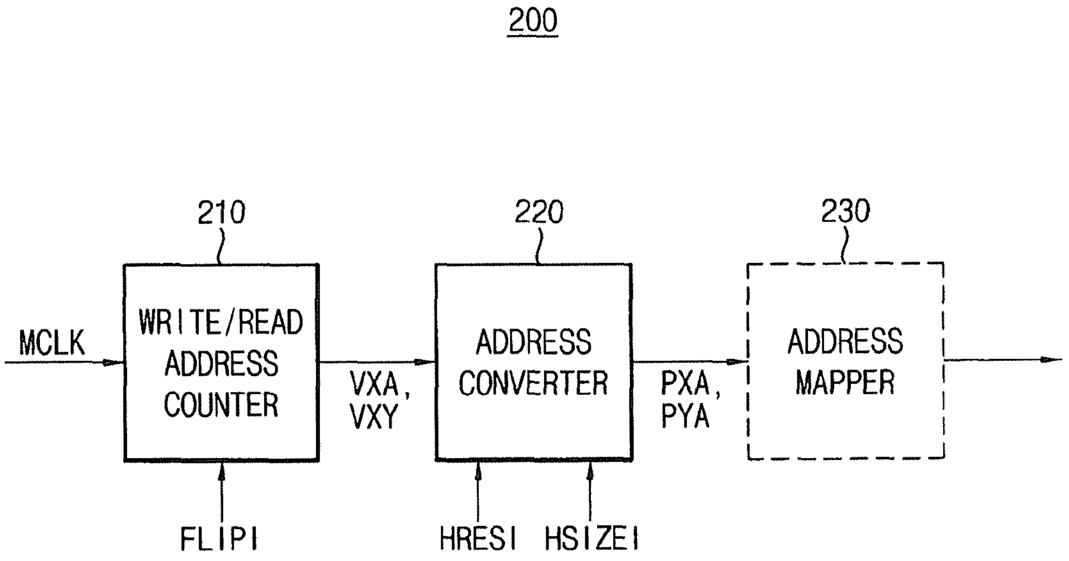
FIG. 4 is a block diagram illustrating an example of a graphic memory control unit according to example embodiments.

FIG. 4 is a block diagram illustrating an example of a graphic memory control unit according to example embodiments.

Referring to FIG. 4, the graphic memory control unit 200 may include an address counter 210 and an address converter 220. The graphic memory control unit 200 may further include an address mapper 230.

The address counter 210 may generate 2-D addresses VXA and VYA based on the input clock signal MCLK and rotation information FLIPI stored in the control register 120. Since the clock signal MCLK may be a signal synchronized with the input data stream DATA from the graphic controller, the 2-D addresses VXA and VYA are virtual addresses for image represented by the input data DATA in a virtual 2-D space.

The address converter 220 may receive the 2-D addresses VXA and VYA, convert the 2-D addresses VXA and VYA to the 1-D addresses LADDR based on first directional total pixel number information HRESI according to a following equation 1 and convert the 1-D addresses LADDR to the physical 2-D addresses PXA and PYA based on first directional size information HSIZEI according to a following equation 2.

$$\text{LADDR}=VXA\times HRES+VYA, \qquad \text{[equation 1]}$$

where VXA denotes page addresses of the 2-D addresses, VYA denotes column addresses of the 2-D addresses, HRES denotes the first directional total pixel number and LADDR denotes the 1-D addresses.

$$PXA=\text{LADDR}/H\text{SIZE},$$

$$PYA=\text{LADDR}\ \%\ H\text{SIZE}, \qquad \text{[equation 2]}$$

where HSIZE denotes the first directional size, PXA denotes physical pages addresses of the physical 2-D addresses and PYA denotes physical column addresses of the physical 2-D addresses.

The physical pages addresses PXA may be obtained by divisional operation of the 1-D addresses LADDR to the first directional size HSIZE of the graphic memory 400, and the physical column addresses PYA may be obtained by modulo operation of the 1-D addresses LADDR to the first directional size HSIZE of the graphic memory 400.

The graphic memory control unit 200 may control the graphic memory 400 such that the input data DATA is stored in the graphic memory 400 according to the physical 2-D addresses PXA and PYA generated by the address converter 220.

Figure 5:
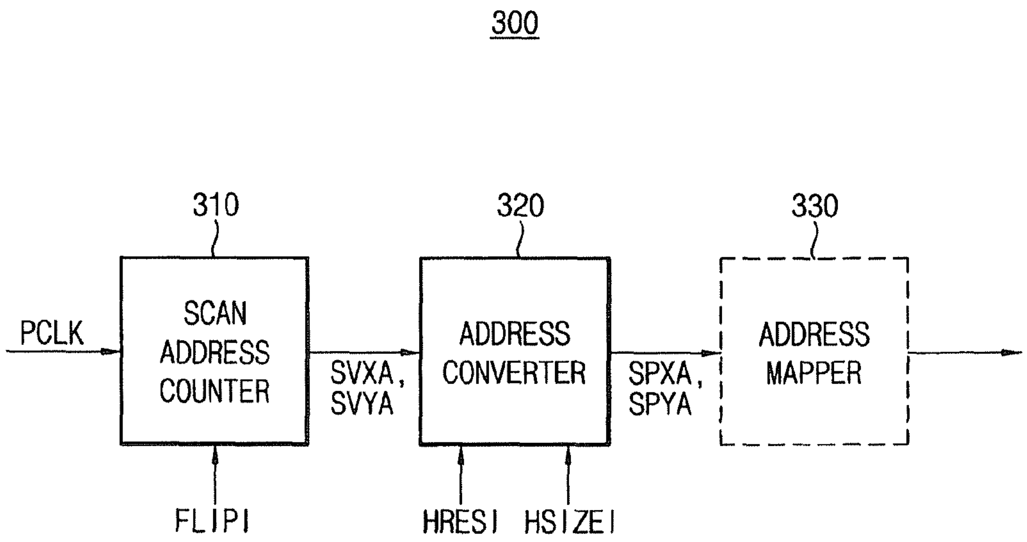
FIG. 5 is a block diagram illustrating an example of a scan control unit according to example embodiments.

FIG. 5 is a block diagram illustrating an example of a scan control unit according to example embodiments.

Referring to FIG. 5, the scan control unit 300 may include an address counter 310 and an address converter 320. The scan control unit 300 may further include an address mapper 330.

The address counter 310 may generate 2-D scan addresses SVXA and SVYA based on an internal clock signal PCLK and rotation information FLIPI stored in the control register 120. The internal clock signal PCLK may be a signal generated in the display controller 100, and the display controller 100 may include a clock generator for generating the internal clock signal PCLK. The 2-D scan addresses SVXA and SVYA are virtual addresses for displaying the data DATA stored in the graphic memory 400 according to the rotation information FLIPI.

The address converter 320 may receive the 2-D scan addresses SVXA and SVYA, convert the 2-D scan addresses SVXA and SVYA to the 1-D scan addresses SLADDR based on first directional total pixel number information HRESI according to a following equation 3 and convert the 1-D scan addresses SLADDR to the physical 2-D scan addresses SPXA and SPYA based on first directional size information HSIZEI according to a following equation 4.

$$\text{SLADDR}=SVXA\times HRES+SVYA, \qquad \text{[equation 3]}$$

where SVXA denotes scan page addresses of the 2-D scan addresses, SVYA denotes scan column addresses of the 2-D scan addresses, HRES denotes the first directional total pixel number and SLADDR denotes the 1-D scan addresses.

$$SPXA=\text{SLADDR}/H\text{SIZE},$$

$$SPYA=\text{SLADDR}\ \%\ H\text{SIZE}, \qquad \text{[equation 4]}$$

where HSIZE denotes the first directional size, SPXA denotes physical scan pages addresses of the physical 2-D scan addresses and SPYA denotes physical scan column addresses of the physical 2-D scan addresses.

The physical scan pages addresses SPXA may be obtained by divisional operation of the 1-D scan addresses SLADDR to the first directional size HSIZE of the graphic memory 400, and the physical scan column addresses SPYA may be obtained by modulo operation of the 1-D scan addresses SLADDR to the first directional size HSIZE of the graphic memory 400.

Figure 6:
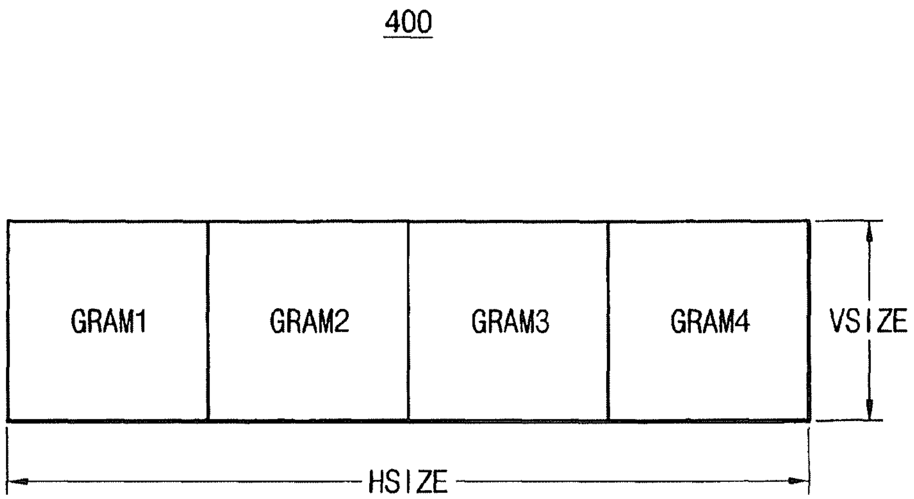
FIG. 6 is a block diagram illustrating an example of a graphic memory in FIG. 2 according to example embodiments.

FIG. 6 is a block diagram illustrating an example of a graphic memory in FIG. 2 according to example embodiments.

Referring to FIG. 6, the graphic memory 400 may include four separate memory areas GRAM1, GRAM2, GRAM3 and GRAM4. When the graphic memory 400 includes the four separate memory areas GRAM1, GRAM2, GRAM3 and GRAM4, the address mapper 230 may interleave the physical 2-D addresses PXA and PYA such that each input of a plurality of consecutive input data DATA is not consecutively written to the same memory areas of the plurality memory areas GRAM1, GRAM2, GRAM3 and GRAM4. For example, when the data DATA are sequentially input in response to the input clock signal MCLK, the address mapper 230 may interleave the physical 2-D addresses PXA and PYA such that a (4n+1)th data piece (n being a natural number) is written to a first memory area GRAM1, a (4n+2)th data piece is written to a second memory area GRAM2, a (4n+3)th data piece is written to a third memory area GRAM3, and a 4n-th data piece is written to a fourth memory area GRAM4. When the graphic memory control unit 200 includes the address mapper 230, the speed at which data is written to a graphic memory 400 may be increased four times by increasing the bandwidth of the graphic memory 400 by four times.

Figure 14:
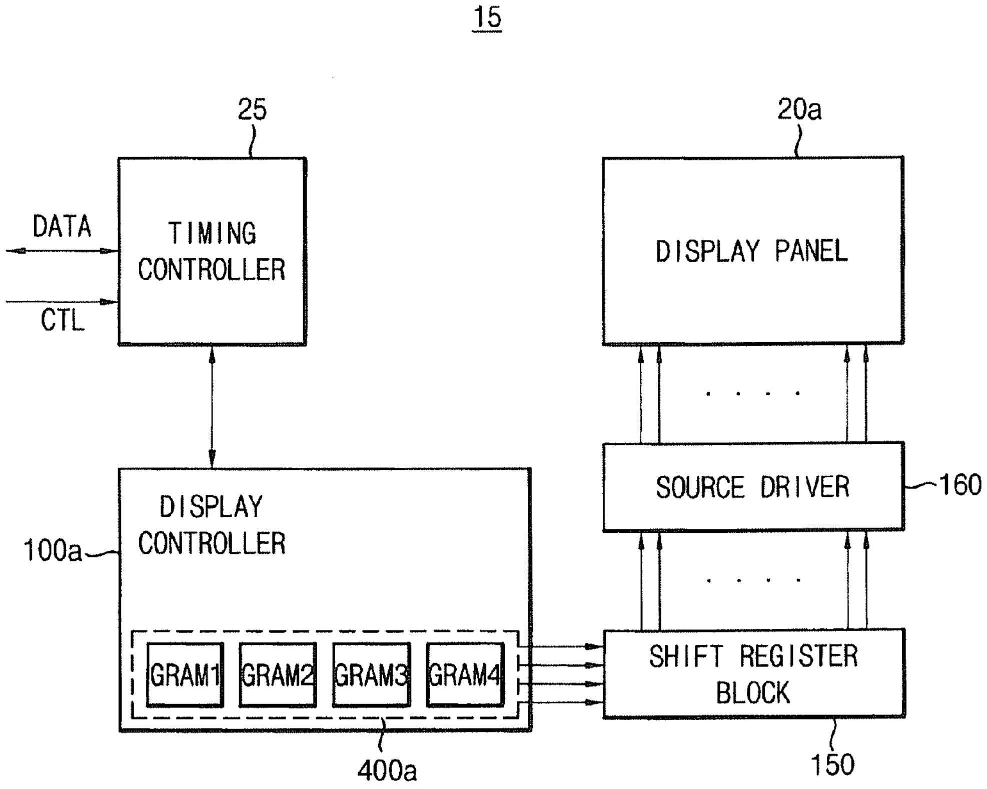
FIG. 14 is a block diagram illustrating an example of a display device according to example embodiments.

In addition, when the graphic memory 400 includes the four separate memory areas GRAM1, GRAM2, GRAM3 and GRAM4, the address mapper 330 may interleave the physical scan addresses SPXA and SPYA such that the data stored in the memory areas GRAM1, GRAM2, GRAM3 and GRAM4 are scanned out to a shift register block 150 in FIG. 14.

Figure 7:
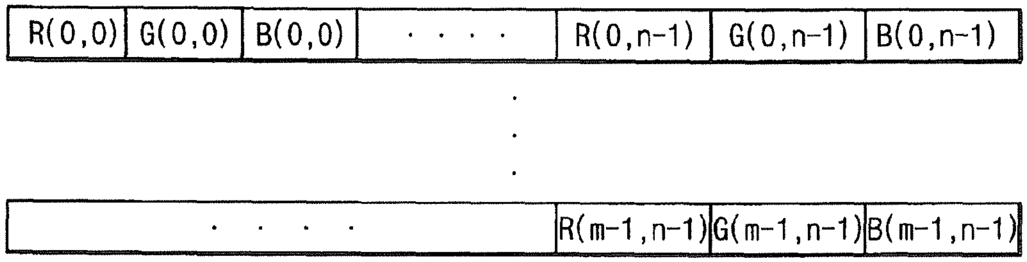
FIG. 7 illustrates an example of streams of input data inputted to the display controller in FIG. 1 according to example embodiments.

FIG. 7 illustrates an example of streams of input data inputted to the display controller in FIG. 1 according to example embodiments.

Referring to FIG. 7, the input data DATA stream may be consecutively input to the display controller 100 with pixels R(0, 0) to B(m−1, n−1) constituting an image to be displayed in line by line. When a R. G. B data constitutes one pixel, the input data stream of FIG. 7 may correspond to an image constituted by n pixels in a first (row) direction and m pixels in a second (column) direction.

Figure 8:
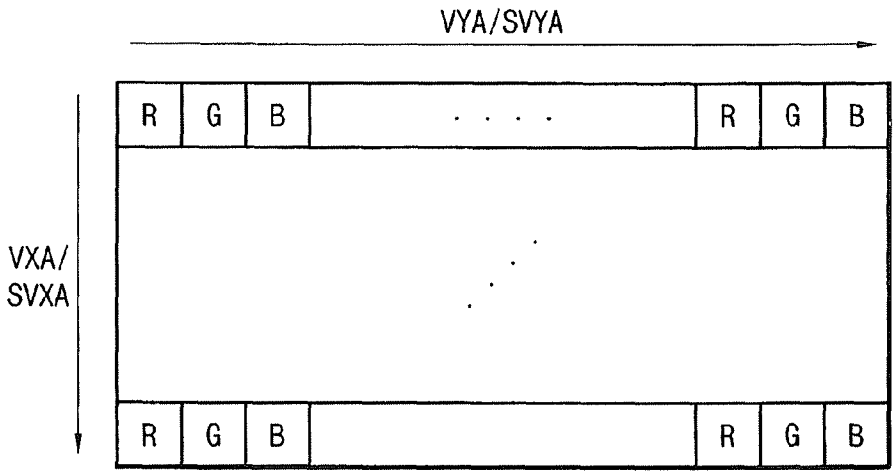
FIG. 8 illustrates an example of 2-D addresses or 2-D scan addresses corresponding to the input data stream of FIG. 7 according to example embodiments.

FIG. 8 illustrates an example of 2-D addresses or 2-D scan addresses corresponding to the input data stream of FIG. 7 according to example embodiments.

Referring to FIG. 8, it is noted that the address counter 210 in FIG. 4 may generate the 2-D addresses VXA and VYA corresponding to each pixel of the input data stream of FIG. 7 based on the input clock signal MCLK and the address counter 310 in FIG. 5 may generate the 2-D scan addresses SVXA and SVYA corresponding to each pixel of the input data stream of FIG. 7 based on the internal clock signal PCLK. The address counter 210 in FIG. 4 may generate the 2-D addresses VXA and VYA based on the rotation information FLIPI, and the address counter 310 in FIG. 5 may generate the 2-D scan addresses SVXA and SVYA based on the rotation information FLIPI. The 2-D addresses VXA and VYA or the 2-D scan addresses SVXA and SVYA may be virtual addresses corresponding to the input data DATA not real addresses assigned to the input data DATA.

FIG. 9 illustrates an example of 1-D addresses converted in the address converter of FIG. 4 according to example embodiments.

Referring to FIG. 9, it is noted that the 2-D addresses VXA and VYA may be converted to the 1-D addresses LADDR according to the equation 1. Referring to the equation 1, the 2-D addresses VXA and VYA with two values designating each pixel in FIG. 8 may be converted to the 1-D addresses LADDR(0)~LADDR(XAm−1*HSIZE+YAn−1) with one value. Since each of the 1-D addresses LADDR(0)~LADDR(XAm−1*HSIZE+YAn−1) has one value, the 1-D addresses LADDR(0)~LADDR(XAm−1*HSIZE+YAn−1) may be assigned to each cell of the graphic memory 400 without regard to the rotation of the image represented by the input data DATA or configuration direction of the graphic memory 400. In addition, each of the 1-D addresses LADDR(0)~LADDR(XAm−1*HSIZE+YAn−1) may be converted to the physical 2-D addresses PXA and PYA with two value for one pixel by the first directional size HSIZE of the graphic memory 400 according to the equation 2. Therefore, the physical 2-D addresses PXA and PYA may be one-to-one mapped to each cell of the graphic memory 400 without regard to the rotation of the image represented by the input data DATA or configuration direction of the graphic memory 400. Accordingly, the graphic memory 400 need not include dummy areas for supporting the landscape mode and the portrait mode, and thus, the display controller 100 may reduce occupied areas for the graphic memory 400.

FIG. 10 illustrates an example of 1-D scan addresses converted in the address converter of FIG. 5 according to example embodiments.

Referring to FIG. 10, it is noted that the 2-D scan addresses SVXA and SVYA may be converted to the 1-D scan addresses SLADDR according to the equation 3. Referring to the equation 3, the 2-D scan addresses SVXA and SVYA with two values designating each pixel in FIG. 8 may be converted to the 1-D scan addresses SLADDR(0)~SLADDR(SXAm−1*HSIZE+SYAn−1) with one value. Since each of the 1-D scan addresses SLADDR(0)~SLADDR(SXAm−1*HSIZE+SYAn−1) has one value, the 1-D scan addresses SLADDR(0)~SLADDR(SXAm−1*HSIZE+SYAn−1) may be assigned to each cell of the graphic memory 400 without regard to the rotation of the image represented by the input data DATA or configuration direction of the graphic memory 400. In addition, each of the 1-D scan addresses SLADDR(0)~SLADDR(SXAm−1*HSIZE+SYAn−1) may be converted to the physical 2-D scan addresses SPXA and PYA with two values for one pixel by the first directional size HSIZE of the graphic memory 400 according to the equation 4. Therefore, the physical 2-D scan addresses SPXA and SPYA may be one-to-one mapped to each cell of the graphic memory 400 without regard to the rotation of the image represented by the input data DATA or configuration direction of the graphic memory 400. Accordingly, the display panel 20 may display the input data DATA in the landscape mode or the portrait mode without regard to the rotation of the image represented by the input data DATA or the resolution of the display panel 20.

Figure 11:
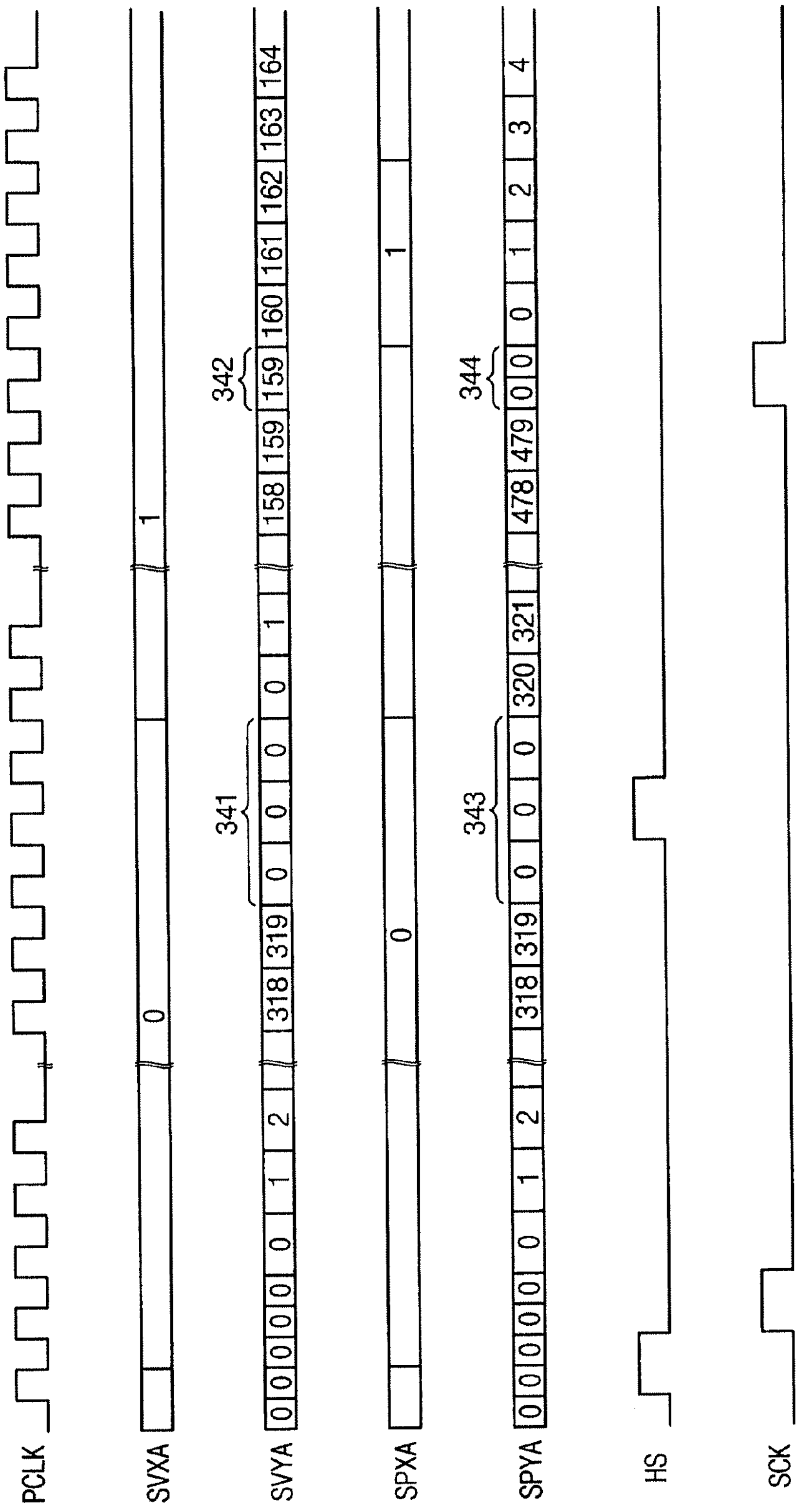
FIGS. 11 through 13 illustrate examples of timing diagrams illustrating operation of the display controller of FIG. 2 according to example embodiments.
Figure 12:
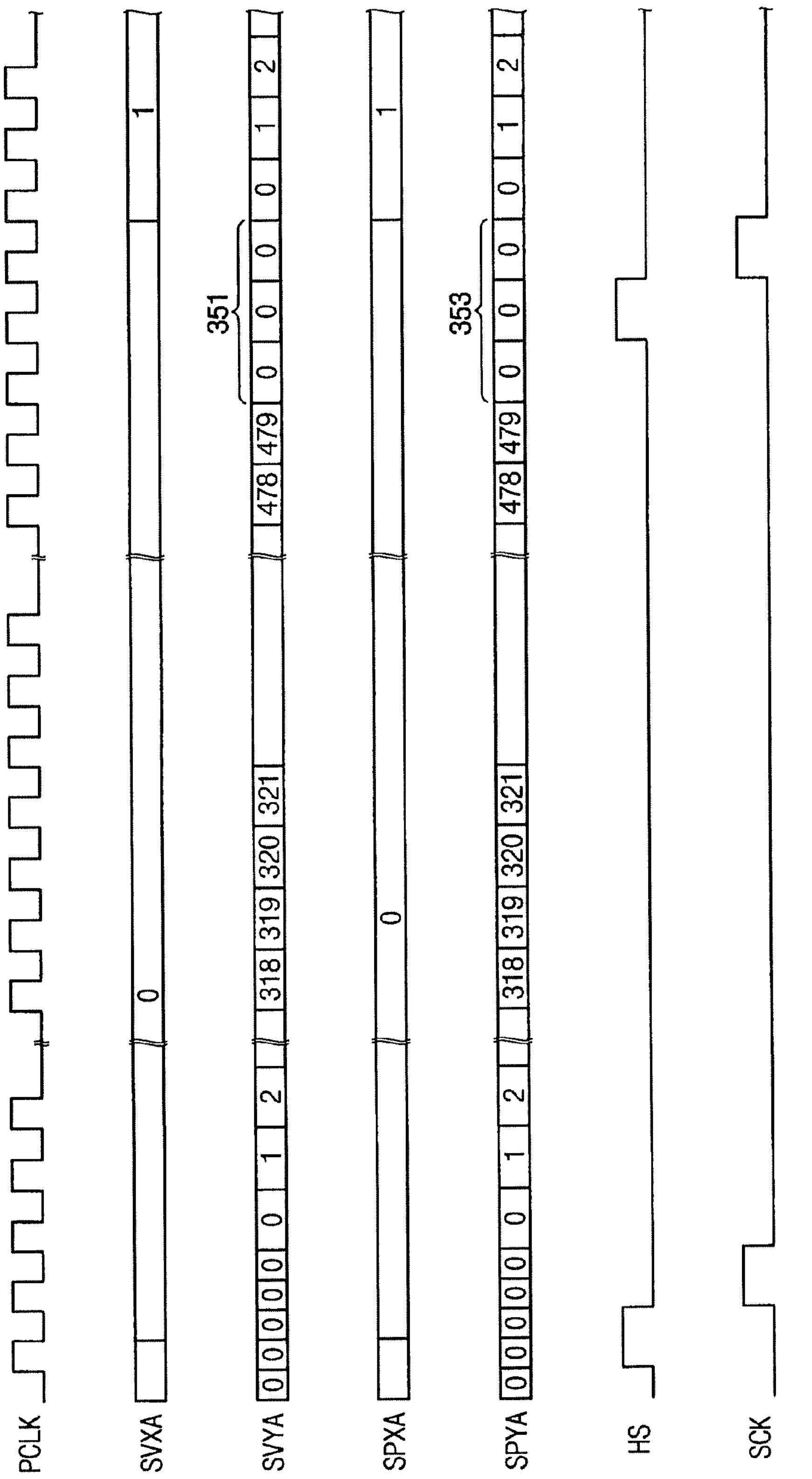
Figure 13:
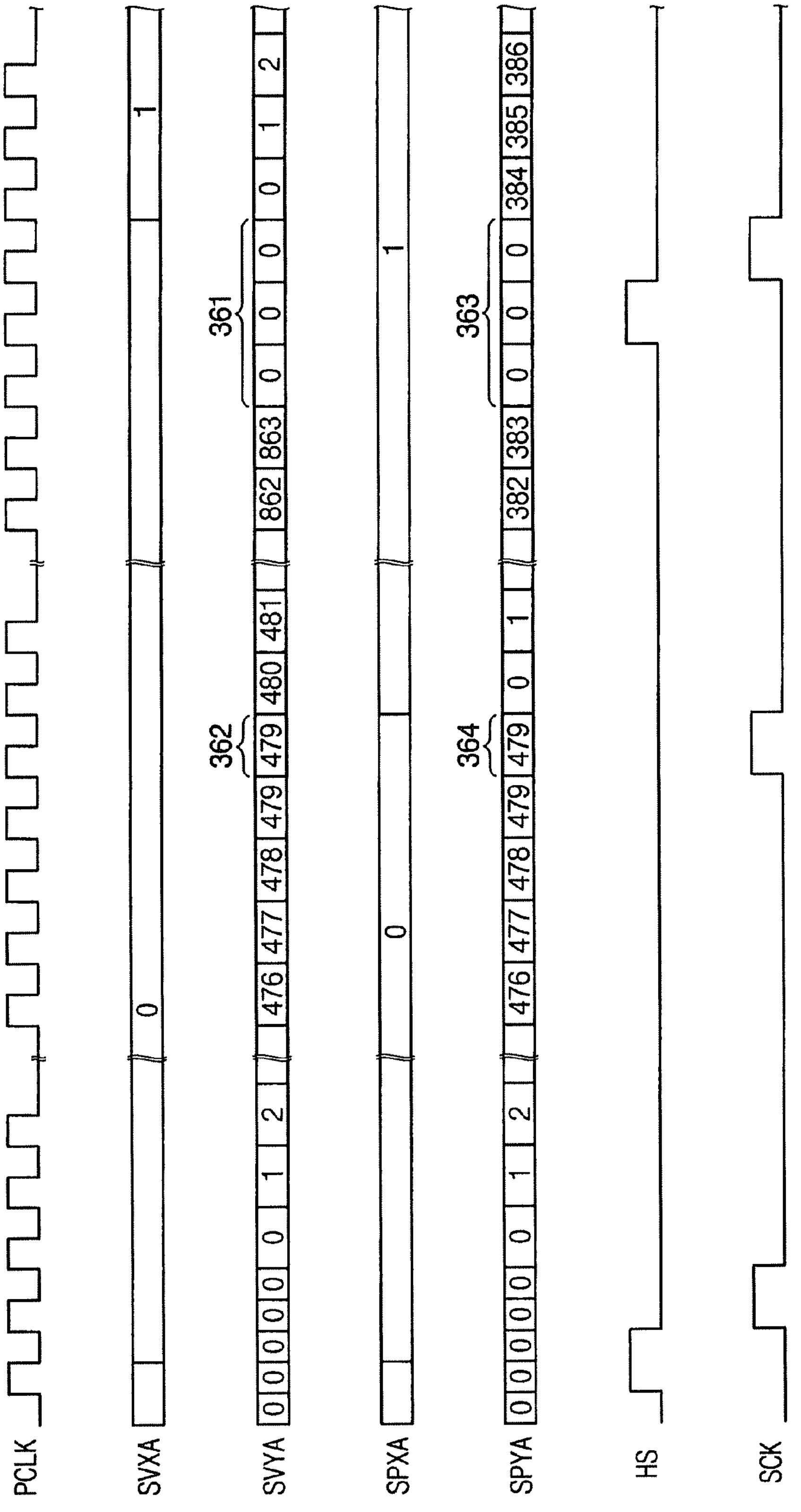

FIGS. 11 through 13 are examples of timing diagrams illustrating operation of the display controller of FIG. 2 according to example embodiments.

FIG. 11 is an example of a timing diagram illustrating operation of the display controller 100 of FIG. 2 when the first directional total pixel number HRES of the display panel 20 is smaller than the first directional size HSIZE of the graphic memory 400. In FIG. 11, the first directional total pixel number HRES of the display panel 20 corresponds to 320 and the first directional size HSIZE of the graphic memory 400 corresponds to 480 in a scan mode. In FIG. 11, one row of the display panel 20 includes 320 pixels and one row of the graphic memory 400 includes 480 memory cells.

Referring to FIG. 11, scan column addresses SVYA; 0~319 of the 2-D scan addresses may be generated in synchronization with the internal clock signal PCLK while a first scan page address SVXA; 0 of the 2-D scan addresses is enabled. In addition, some of scan column addresses SVYA; 0~465 of the 2-D scan addresses may be generated in synchronization with the internal clock signal PCLK while a second scan page address SVXA; 1 of the 2-D scan addresses is enabled. Since the 2-D scan addresses SVXA and SVYA are based on the first directional total pixel number HRES of the display panel 20 with reference to the equation 3, the scan page address SVXA may be increased by one whenever 320 scan column addresses SVYA corresponding to the first directional total pixel number HRES of the display panel 20 are generated. In addition, since a horizontal synchronization signal HS may be associated with scan lines, for example, the scan page addresses SVXA of the display panel 20, the horizontal synchronization signal HS may be enabled before the scan column addresses SVYA corresponding to each of the scan page address SVXA are generated.

Since the physical 2-D scan addresses SPXA and SPYA may be based on the first directional size HSIZE of the graphic memory 400 with reference to the equation 4, the physical scan page address SPXA may be increased by one whenever 480 physical scan column addresses SPYA corresponding to the first directional size HSIZE of the graphic memory 400 are generated. In addition, since a scan clock signal SCK may be associated with wordlines of the graphic memory 400, for example, the physical scan page addresses SPXA of the graphic memory 400, the scan clock signal SCK may be enabled before the physical scan column addresses SPYA corresponding to each of the physical scan page address SPXA are generated.

In FIG. 11, since the first directional total pixel number HRES of the display panel 20 may correspond to 320, all pixel data of a first scan line SVXA; 0 and some pixel data SVYA; 0~159 of a second scan line SVXA; 1 may be stored in a same row designated by the physical scan page address SPXA and output to the display panel 20. For doing this, the scan column address SVYA of the display panel 20 corresponding to one scan line of the display panel 20 may be increased again from 0 to 319, held at 0 during porch period 341, and may be increased from 0, and the physical scan column address SPYA of the graphic memory 400 may be increased from 0 to 319, held at 0 during a porch period 343, and increased from 320. In addition, since the physical scan column address SPYA needs to be increased to 479 and the physical scan page address SPXA needs to be increased from 0 to 1, the physical scan column address SPYA may be held at 0 during an interval of a reference numeral 344, and is increased again from 0, and the scan column address SVYA may be increased to 159, held at 159 during an interval of a reference numeral 342, and increased again from 160.

FIG. 12 is an example of a timing diagram illustrating operation of the display controller 100 of FIG. 2 when the first directional total pixel number HRES of the display panel 20 is same as the first directional size HSIZE of the graphic memory 400. In FIG. 12, the first directional total pixel number HRES of the display panel 20 may correspond to 480 and the first directional size HSIZE of the graphic memory 400 may correspond to 480 in a scan mode. For example, in FIG. 12, one row of the display panel 20 includes 480 pixels and one row of the graphic memory 400 includes 480 memory cells.

Referring to FIG. 12, scan column addresses SVYA; 0~479 of the 2-D scan addresses may be generated in synchronization with the internal clock signal PCLK while a first scan page address SVXA; 0 of the 2-D scan addresses is enabled. In addition, after the scan clock signal SCK is enabled, physical scan column addresses SPYA; 0~479 may be generated for corresponding to scan column addresses SVYA; 0~479. Since the first directional total pixel number HRES of the display panel 20 may be the same as the first directional size HSIZE of the graphic memory 400, all pixel data of one scan line of the display panel 20 may be stored in one row of the graphic memory 400 and are output to the display panel 20. In FIG. 12, a porch interval 351 of the scan column address SVYA may be a holding portion before the scan column address SVXA is increased by one and a porch interval 353 of the physical scan page address SPYA may be a holding portion before the physical scan page address SPXA is increased by one.

FIG. 13 is an example of a timing diagram illustrating operation of the display controller 100 of FIG. 2 when the first directional total pixel number HRES of the display panel 20 is greater than the first directional size HSIZE of the graphic memory 400. In FIG. 13, the first directional total pixel number HRES of the display panel 20 may correspond to 864 and the first directional size HSIZE of the graphic memory 400 may correspond to 480 in a scan mode. For example, in FIG. 13, one row of the display panel 20 includes 864 pixels and one row of the graphic memory 400 includes 480 memory cells.

Referring to FIG. 13, scan column addresses SVYA; 0~863 of the 2-D scan addresses may be generated in synchronization with the internal clock signal PCLK while a first scan page address SVXA; 0 of the 2-D scan addresses is enabled. While the scan column addresses SVYA; 0~479 are generated, physical scan column addresses SPYA; 0~479 may be generated while a first scan page address SPXA; 0 is enabled. While the scan column addresses SVYA; 480~863 are generated, physical scan column addresses SPYA; 0~383 may be generated while a second scan page address SPXA; 1 is enabled. For example, pixel data SVYA; 0~863 of a first scan line of the display panel 20 may be stored in all of memory cells of a first row PVXA; 0 and some of memory cells of a second row PVXA; 1 of the graphic memory 400 and may be output to the first scan line of the display panel 20. In FIG. 13, portions 362 and 364 of the scan column address SVYA and physical scan column address SPYA may be portions before the physical scan page address SPXA is increased by one and porch intervals 361 and 363 of the scan column address SVYA and physical scan column address SPYA may be holding portions before the scan page address SVXA is increased by one. In addition, FIG. 13 illustrates a case when an image is displayed in a landscape mode.

As described with reference to FIGS. 11 to 13, the image in the portrait mode may be converted to the image in the landscape mode without increasing areas of the graphic memory because the physical 2-D scan addresses SPXA and SPYA may be converted from the 1-D scan addresses SLADDR by the first directional size HSIZE of the graphic memory 400 using the equation 4 according to some example embodiments. Therefore, the display controller 100 may convert the image in the portrait mode to the image in the landscape mode without increasing areas of the graphic memory.

FIG. 14 is an example of a block diagram illustrating an example of a display device according to example embodiments.

Referring to FIG. 14, a display device 15 may include a timing controller 25, a display controller 100*a*, a shift register block 150, a source driver 160 and a display panel 20*a*.

The timing controller 25 may exchange data DATA with an external graphic controller and receive a control signal CTL. The timing controller 25 may exchange the data DATA and the control signal CTL with the display controller 100*a*. The display controller 100*a* may include a graphic memory 400 having a plurality of memory areas GRAM1, GRAM2, GRAM3 and GRAM4 separate from each other. The display controller 100*a* may include an address mapper 230 which interleaves the physical 2-D addresses PXA and PYA such that each input of a plurality of consecutive input data DATA may not be consecutively written to the same memory areas of the plurality memory areas GRAM1, GRAM2, GRAM3 and GRAM4.

The scanned-out data from the plurality memory areas GRAM1, GRAM2, GRAM3 and GRAM4 may be rearranged, stored temporarily in units of lines in the shift register block 160 and transmitted to the source driver 160. The source driver 160 may receive the data in units of lines from the shift register block 150 and transmit the received data to a display panel 20*a*.

In example embodiments, when the data DATA are interleaved and sequentially consecutively written to the memory areas GRAM1, GRAM2, GRAM3 and GRAM4, the scanned-out data from the plurality memory areas GRAM1, GRAM2, GRAM3 and GRAM4 need not to be rearranged. In this case, the shift register block 160 may temporarily store the scanned-out data from the plurality memory areas GRAM1, GRAM2, GRAM3 and GRAM4 in units of lines to provide the data to the source driver 160.

The display controller 100*a* of FIG. 14 may have substantially the same configuration as the display controller 100 of FIG. 2. Therefore, the display controller 100*a* may include the interface 110, the control register 120, the graphic memory control unit 200, the scan control unit 300 and the graphic memory 400*a*.

Figure 15:
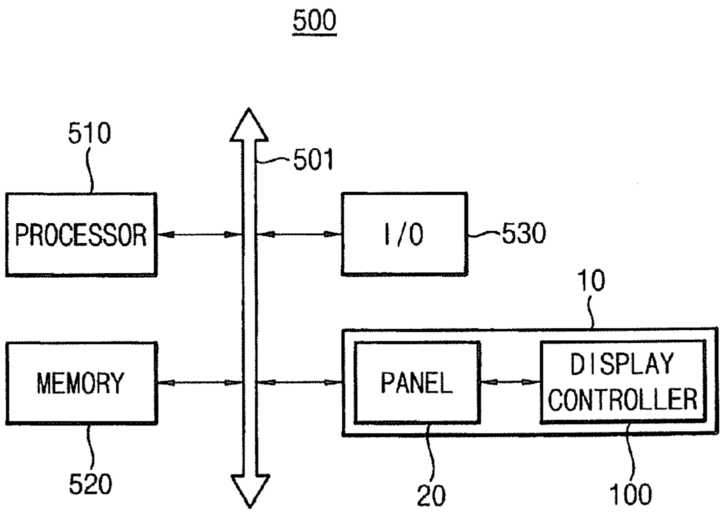
FIG. 15 is a block diagram illustrating an example of an electric device including the display device of FIG. 1 according to some example embodiments.

FIG. 15 is an example of a block diagram illustrating an electric device including the display device of FIG. 1 according to example embodiments.

Referring to FIG. 15, an electric device 500 may include a processor 510, a memory device 520, an input/output (I/O) device 530, and a display device 10.

The processor 510 may perform specific calculations, or computing functions for various tasks. For example, the processor 510 may correspond to a microprocessor, a central processing unit (CPU), etc. The processor 510 may be coupled to the memory device 520 via a bus 501. For example, the memory device 520 may include at least one volatile memory device such as a dynamic random access memory (DRAM) device, a static random access memory (SRAM) device, etc and/or at least one non-volatile memory device such as an erasable programmable read-only memory (EPROM) device, an electrically erasable programmable read-only memory (EEPROM) device, a flash memory device, etc. The memory device 520 may store software performed by the processor 510. The I/O device 530 may be coupled to the bus 501. The I/O device 530 may include at least one input device (e.g., a keyboard, keypad, a mouse, etc), and/or at least one output device (e.g., a printer, a speaker, etc). The processor 510 may control operations of the I/O device 530.

The display device 10 may be coupled to the processor 510 via the bus 501. The display device 10 may include a display controller 100 and a display panel 20. The display controller 100 may convert the 2-D addresses to the 1-D addresses based on the first directional total number of pixels of the display panel 20 and convert the 1-D addresses to the physical 2-D addresses based on the first directional size of a graphic memory in the display controller 100. The display controller 100 may store data in the graphic memory and output the date stored in the graphic memory to the display panel 20 based on the physical 2-D addresses. Therefore, the display controller 100 may convert the image in the portrait mode to the image in the landscape mode without increasing areas of the graphic memory.

The electric device 500 may correspond to a digital television, a cellular phone, a smart phone, a personal digital assistant (PDA), a portable multimedia player (PMP), a MP3 player, a laptop computer, a desktop computer, a digital camera, etc.

Example embodiments may be applied to any type of display device requiring full graphic memories.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of example embodiments. Accordingly, all such modifications are intended to be included within the scope of example embodiments as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A display controller comprising:

a graphic memory having a storage capacity defined by a first directional size multiplied by a second directional size;

a graphic memory controller configured to, convert two-dimensional (2-D) addresses to one-dimensional (1-D) addresses based on an input clock signal and first directional total pixel number of a display panel, convert the 1-D addresses to physical 2-D addresses based on the first directional size, and control the graphic memory to store input data based on the physical 2-D addresses, the display panel having a display resolution corresponding to the first directional total pixel number multiplied by a second directional total pixel number of the display panel; and a scan controller coupled to the graphic memory, the scan controller configured to, increase scan addresses one line by one line for displaying the input data stored in the graphic memory according to the display resolution, and control the graphic memory to output the stored input data to the display panel such that the stored input data is displayed on the display panel.

2. The display controller of claim 1, wherein the graphic memory controller comprises:

an address counter configured to generate the 2-D addresses based on the input clock signal and a control signal; and an address converter configured to convert the 2-D addresses to the 1-D addresses based on the first directional total pixel number and configured to convert the 1-D addresses to the physical 2-D addresses based on the first directional size.

3. The display controller of claim 2, where the 2-D addresses are converted to the 1-D addresses based on a following equation 1:

$$LADDR = VXA \times HRES + VYA, \quad \text{[equation 1]}$$

where VXA denotes page addresses of the 2-D addresses, VYA denotes column addresses of the 2-D addresses, HRES denotes the first directional total pixel number and LADDR denotes the 1-D addresses.

4. The display controller of claim 3, where the 1-D addresses are converted to the physical 2-D addresses based on a following equation 2:

$$PXA=\text{LADDR}/H\text{SIZE},$$

$$PYA=\text{LADDR}\ \%\ H\text{SIZE}, \quad \text{[equation 2]}$$

where HSIZE denotes the first directional size, PXA denotes physical page addresses of the physical 2-D addresses and PYA denotes physical column addresses of the physical 2-D addresses.

5. The display controller of claim 1, wherein the graphic memory includes a plurality of memory areas separate from each other.

6. The display controller of claim 5, further comprising an address mapper configured to interleave the physical 2-D addresses such that each input of a plurality of consecutive input data is not consecutively written to the same memory areas of the plurality memory areas.

7. The display controller of claim 1, further comprising a control register configured to receive a control signal to provide information of the first directional total pixel number and the first directional size to the graphic memory controller and to the scan controller.

8. The display controller of claim 7, wherein the control register is configured to receive the control signal to provide rotation information of an image indicating a display mode of the display panel to the graphic memory controller and to the scan controller.

9. The display controller of claim 1, wherein the scan controller comprises:

an address counter configured to generate 2-D scan addresses based on an internal clock signal and a control signal; and an address converter configured to convert the 2-D scan addresses to 1-D scan addresses based on the first directional total pixel number and configured to convert the 1-D scan addresses to physical 2-D scan addresses based on the first directional size.

10. The display controller of claim 9, where the 2-D scan addresses are converted to the 1-D addresses based on a following equation 3:

$$\text{SLADDR}=SVXA\times HRES+SVYA, \quad \text{[equation 3]}$$

where SVXA denotes scan page addresses of the 2-D scan addresses, SVYA denotes scan column addresses of the 2-D scan addresses, HRES denotes the first directional total pixel number and SLADDR denotes the 1-D scan addresses.

11. The display controller of claim 10, where the 1-D scan addresses are converted to the physical 2-D scan addresses based on a following equation 4:

$$SPXA=\text{SLADDR}/H\text{SIZE},$$

$$SPYA=\text{LADDR}\ \%\ H\text{SIZE}, \quad \text{[equation 4]}$$

where HSIZE denotes the first directional size, SPXA denotes physical scan page addresses of the physical 2-D scan addresses and SPYA denotes physical scan column addresses of the physical 2-D scan addresses.

12. A display device comprising:

a display panel, the display panel having a display resolution corresponding to a first directional total pixel number of the display panel multiplied by a second directional total pixel number; and a display controller configured to control the display panel, the display panel comprising:

a graphics memory having a storage capacity defined by the first directional size multiplied by the second directional size;

a graphic memory controller configured to, convert two-dimensional (2-D) addresses to one-dimensional (1-D) addresses based on an input clock signal and the first directional total pixel number, convert the 1D addresses to physical 2D addresses based on the first directional size, and control the graphic memory to store input data based on the physical 2-D addresses; and a scan controller configured to, increase scan addresses one line by one line for displaying the input data stored in the graphic memory according to the display resolution, and control the graphic memory to output the stored input data to the display panel such that the stored input data is displayed on the display panel.

13. The display device of claim 12, wherein the display controller further comprises a control register configured to receive a control signal to provide information of the first directional total pixel number and the first directional size to the graphic memory controller and to the scan controller.

14. A display controller comprising:

a graphic memory controller configured to convert first two-dimensional (2-D) addresses to physical 2-D addresses based on (i) an input clock signal, (ii) a first directional total pixel number of a display panel, and (iii) a first directional size of a graphic memory, the graphic memory controller configured to control the graphic memory to store input data based on the physical 2-D addresses, the display panel having a resolution corresponding to the first directional total pixel number multiplied by a second directional total pixel number of the display panel, and the graphic memory includes a storage capacity defined by the first directional size multiplied by a second directional size; and a scan controller configured to (i) increase scan addresses one line by one line to display data stored in the graphic memory, and (ii) control the graphic memory to output the stored input data to the display panel such that the stored input data is displayed on the display panel.

15. The display controller of claim 14, wherein the graphic memory controller comprises:

an address counter configured to generate the first 2-D addresses based on the input clock signal and a control signal; and an address converter configured to convert the 2-D addresses to the physical 2-D addresses based on the first directional total pixel number and the first directional size.

16. The display controller of claim 15, where the first 2-D addresses are converted to the physical 2-D addresses based on a following equation 5:

$$PXA=(VXA\times HRES+VYA)/H\text{SIZE},$$

$$PYA=(VXA\times HRES+VYA)\ \%\ H\text{SIZE}, \quad \text{[equation 5]}$$

where VXA denotes page addresses of the first 2-D addresses, VYA denotes column addresses of the first 2-D addresses, HRES denotes the first directional total pixel number, HSIZE denotes the first directional size, PXA denotes physical page addresses of the physical 2-D addresses and PYA denotes physical column addresses of the physical 2-D addresses.

17. The display controller of claim 14, wherein the scan controller comprises:

an address counter configured to generate 2-D scan addresses based on an internal clock signal and a control signal; and an address converter configured to convert the 2-D scan addresses to physical 2-D scan addresses based on the first directional total pixel number and the first directional size.

18. The display controller of claim 17, where the 2-D scan addresses are converted to the physical 2-D scan addresses based on a following equation 6:

$$SPXA=(SVXA\times HRES+VYA)/HSIZE,$$

$$SPYA=(SVXA\times HRES+VYA)\ \%\ HSIZE, \qquad \text{[equation 6]}$$

where SVXA denotes scan page addresses of the 2-D scan addresses, SVYA denotes scan column addresses of the 2-D scan addresses, HRES denotes the first directional total pixel number, HSIZE denotes the first directional size, SPXA denotes physical scan page addresses of the physical 2-D scan addresses and SPYA denotes physical scan column addresses of the physical 2-D scan addresses.

* * * * *